(12) United States Patent
Landphair et al.

(10) Patent No.: US 9,744,817 B2
(45) Date of Patent: Aug. 29, 2017

(54) APPARATUS AND METHOD FOR AUTOMATIC TIRE PRESSURE ADJUSTMENT

(71) Applicant: DEERE & COMPANY, Moline, IL (US)

(72) Inventors: Donald Landphair, Moline, IL (US); Charles T Graham, CO Springs, CO (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 14/926,509

(22) Filed: Oct. 29, 2015

(65) Prior Publication Data

US 2017/0120698 A1 May 4, 2017

(51) Int. Cl.
*B60C 23/00* (2006.01)
(52) U.S. Cl.
CPC .................................. *B60C 23/004* (2013.01)
(58) Field of Classification Search
CPC .................................................. B60C 23/004
See application file for complete search history.

(56) References Cited

U.S. PATENT DOCUMENTS

| | | | |
|---|---|---|---|
| 3,924,876 A * | 12/1975 | Vaillant | .................. B02C 21/02 280/764.1 |
| 6,098,682 A | 8/2000 | Kis | |
| 6,779,618 B2 | 8/2004 | Tarasinski | |
| 7,302,837 B2 | 12/2007 | Wendte | |
| 8,505,645 B1 | 8/2013 | Kelly et al. | |
| 8,589,049 B2 | 11/2013 | Craig | |
| 2007/0068238 A1 | 3/2007 | Wendte | |
| 2007/0113635 A1 | 5/2007 | Corniot | |
| 2012/0046837 A1 | 2/2012 | Anderson | |
| 2014/0165891 A1 | 6/2014 | Garner et al. | |

FOREIGN PATENT DOCUMENTS

| | | |
|---|---|---|
| EP | 1594355 B1 | 4/2008 |
| EP | 1529427 B1 | 7/2008 |
| EP | 2443915 A1 | 4/2012 |
| EP | 2583543 A1 | 4/2013 |

* cited by examiner

*Primary Examiner* — Michael D Lang

(57) ABSTRACT

In accordance with an example embodiment, a method comprising determining a change in configuration of a mobile machine, and in response to determining the change in configuration, initiating adjustment of a pressure of at least one tire of the mobile machine is disclosed.

11 Claims, 6 Drawing Sheets

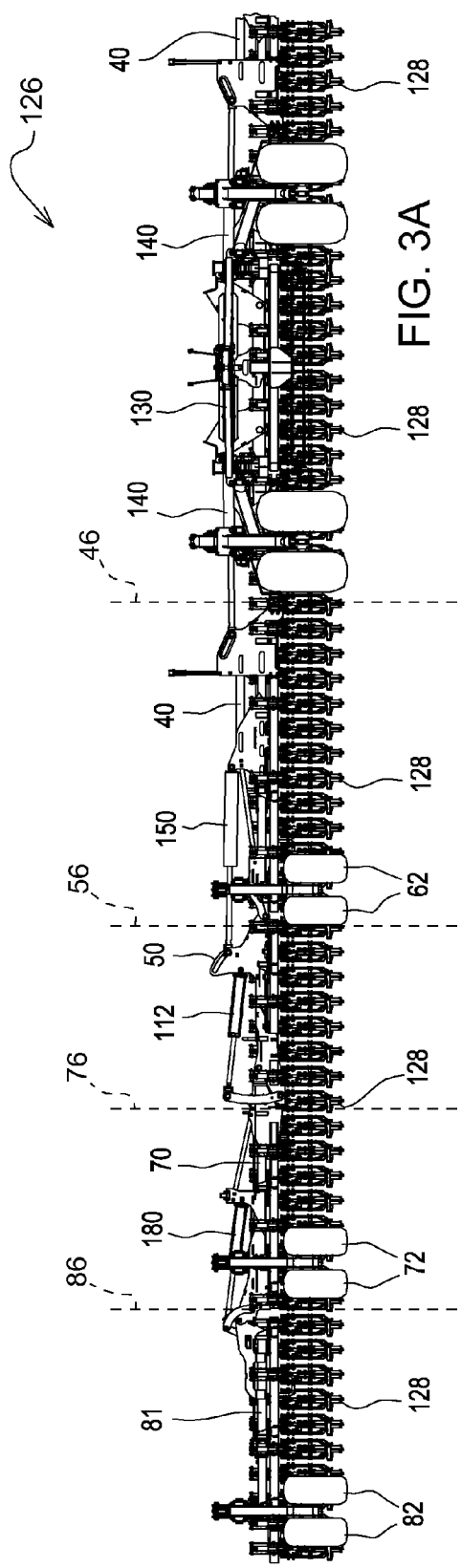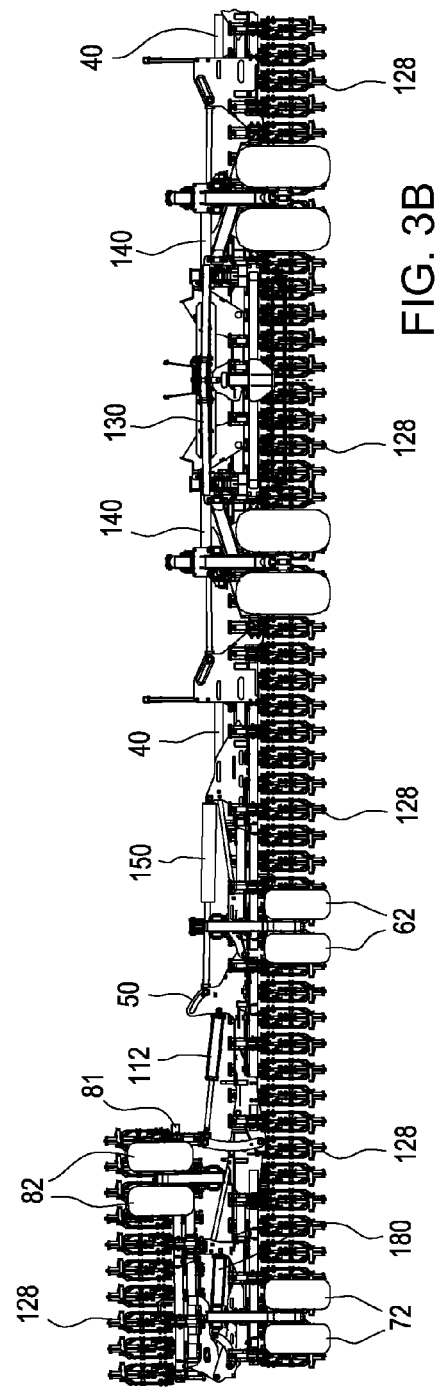

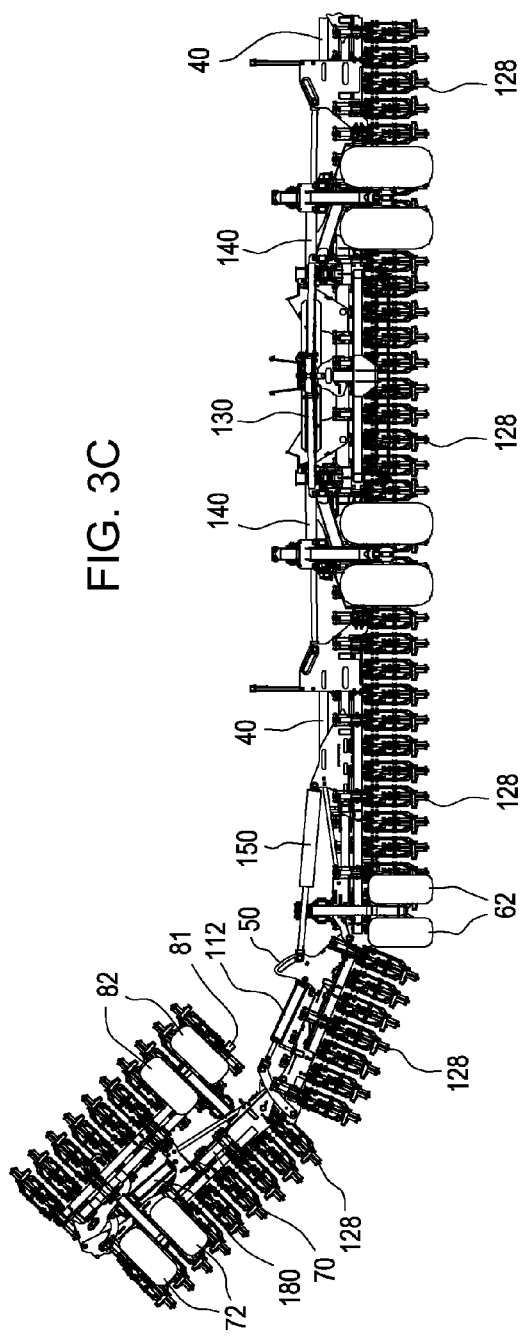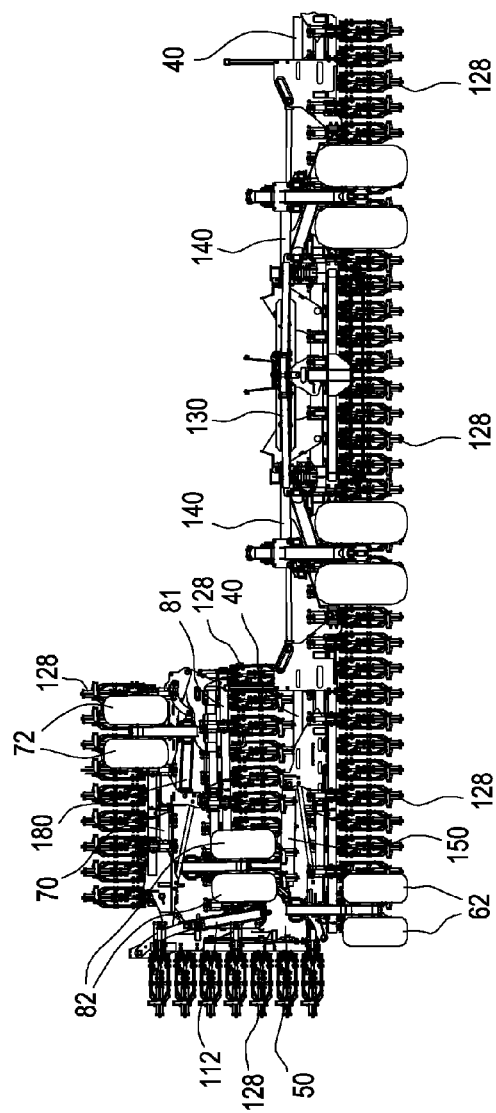

APPARATUS AND METHOD FOR AUTOMATIC TIRE PRESSURE ADJUSTMENT

TECHNICAL FIELD

The present disclosure relates generally to an apparatus and method for automatic tire pressure adjustment.

BACKGROUND

The size and weight of off-road equipment, such as tractors, combines, loaders, etc. has been increasing over time. In part, due to the increased weight of such equipment, compaction of soil in a worksite of such equipment has increased.

SUMMARY

Various aspects of examples of the disclosure are set out in the claims.

According to a first aspect, a method comprises determining a change in configuration of a mobile machine, and in response to determining the change in configuration, initiating adjustment of a pressure of at least one tire of the mobile machine.

According to a second aspect, an apparatus comprises a mobile machine and a central tire inflation system operable to adjust a pressure of at least one tire of the mobile machine in response to a determination of a change in configuration of the mobile machine.

BRIEF DESCRIPTION OF THE DRAWINGS

The detailed description of the drawings refers to the accompanying figures in which:

FIGS. 3A-3D are example rear views of the left side of a frame of an implement;

DETAILED DESCRIPTION OF THE DRAWINGS

At least one example embodiment of the subject matter of this disclosure is understood by referring to FIGS. 1 through 4 of the drawings.

Figure 1:
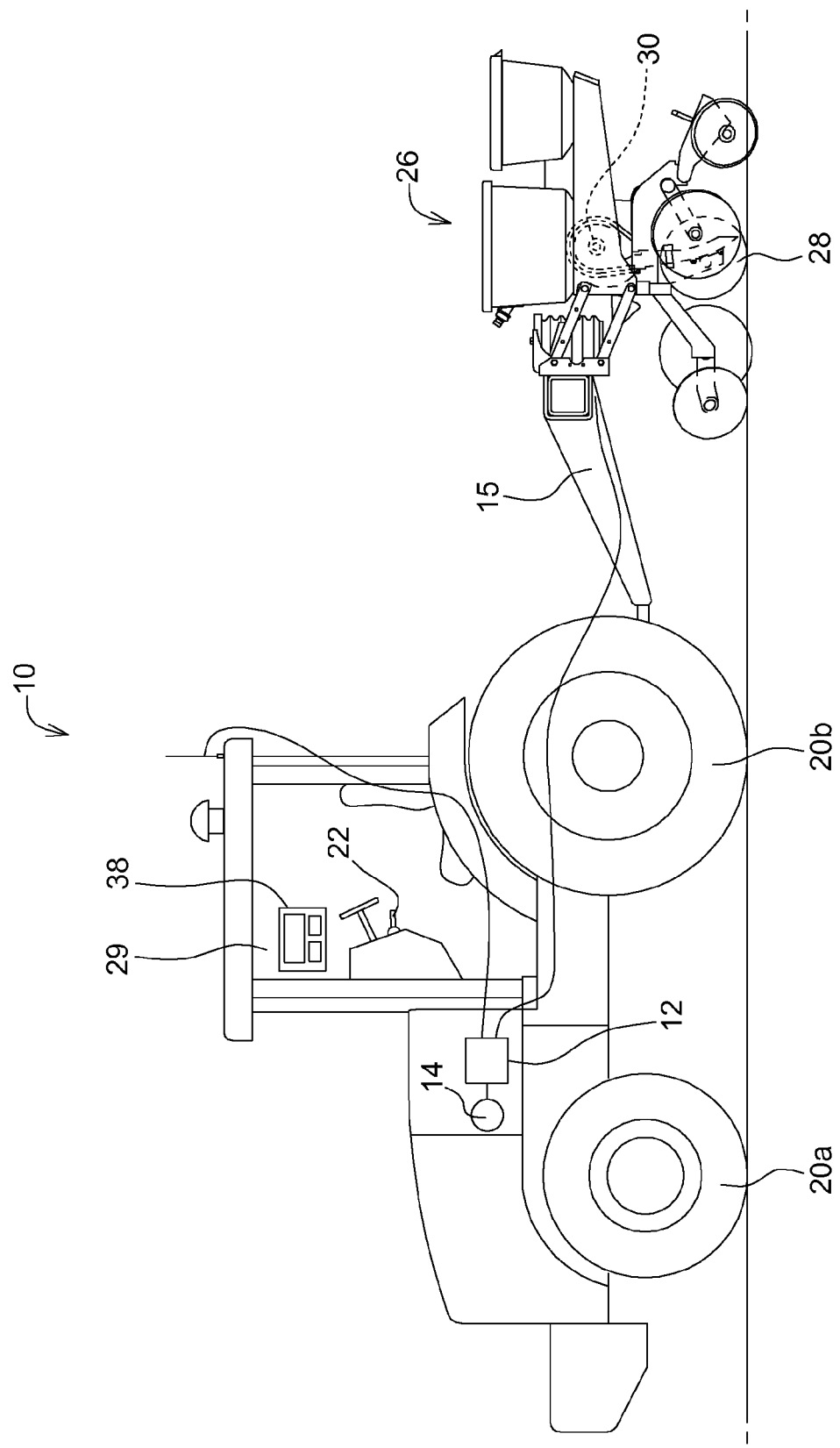
FIG. 1 is a side view of an example mobile machine pulling an example implement.

FIG. 1 is a side view of an example mobile machine 10 coupled with an example implement 26. As an example, mobile machine 10 may comprise an agricultural equipment, a construction equipment, a forestry equipment, etc. Mobile machine 10 could be a self-propelled mobile machine with utility elements coupled to it. The utility elements may comprise as an example, a seeder, a planter, a sprayer, a bucket, a mower, a tillage tool, a rake, a conditioner, a compactor, a header, or the like.

Implement 26 may comprise as an example, a seeder, a planter, a sprayer, a bucket, a mower, a tillage tool, a rake, a conditioner, a compactor, a header, or the like. However, for the sake of convenience, the present disclosure will be described in terms of the mobile machine comprising an agricultural equipment, such as a tractor, and the implement comprising a seeder.

Mobile machine 10 comprises a controller 12, a tire inflation controller 14, mobile machine front tires 20a and mobile machine rear tires 20b. Mobile machine 10 also comprises a cab 29. Cab 29 comprises an input 22. Input 22 comprises one or more devices by which controls and input may be provided to controller 12. Examples of input 22 include, but are not limited to, a manually operable switch, a keyboard, a touchpad, a touch screen, a steering wheel or steering control, a joystick, a microphone with associated speech recognition software, and/or the like. Input 22 facilitates the input of selections, commands or controls.

Cab 29 may also comprise a display 38. Display 38 may be used to display information to the operator or it may be used to receive input from the operator. Input 22 may be used by an operator of mobile machine 10 to initiate a change in configuration of mobile machine 10 and/or implement 26, such as by sending a signal to controller 12. In some embodiments, the display 38 may be used by the operator to initiate a change in configuration of mobile machine 10 and/or implement 26.

In an example, mobile machine 10 and implement 26 are coupled together, for example by a tongue 14. Implement 26 comprises tires 28 and at least one configuration sensor 30. In another example, configuration sensor 30 is part of mobile machine 10.

Figure 2:
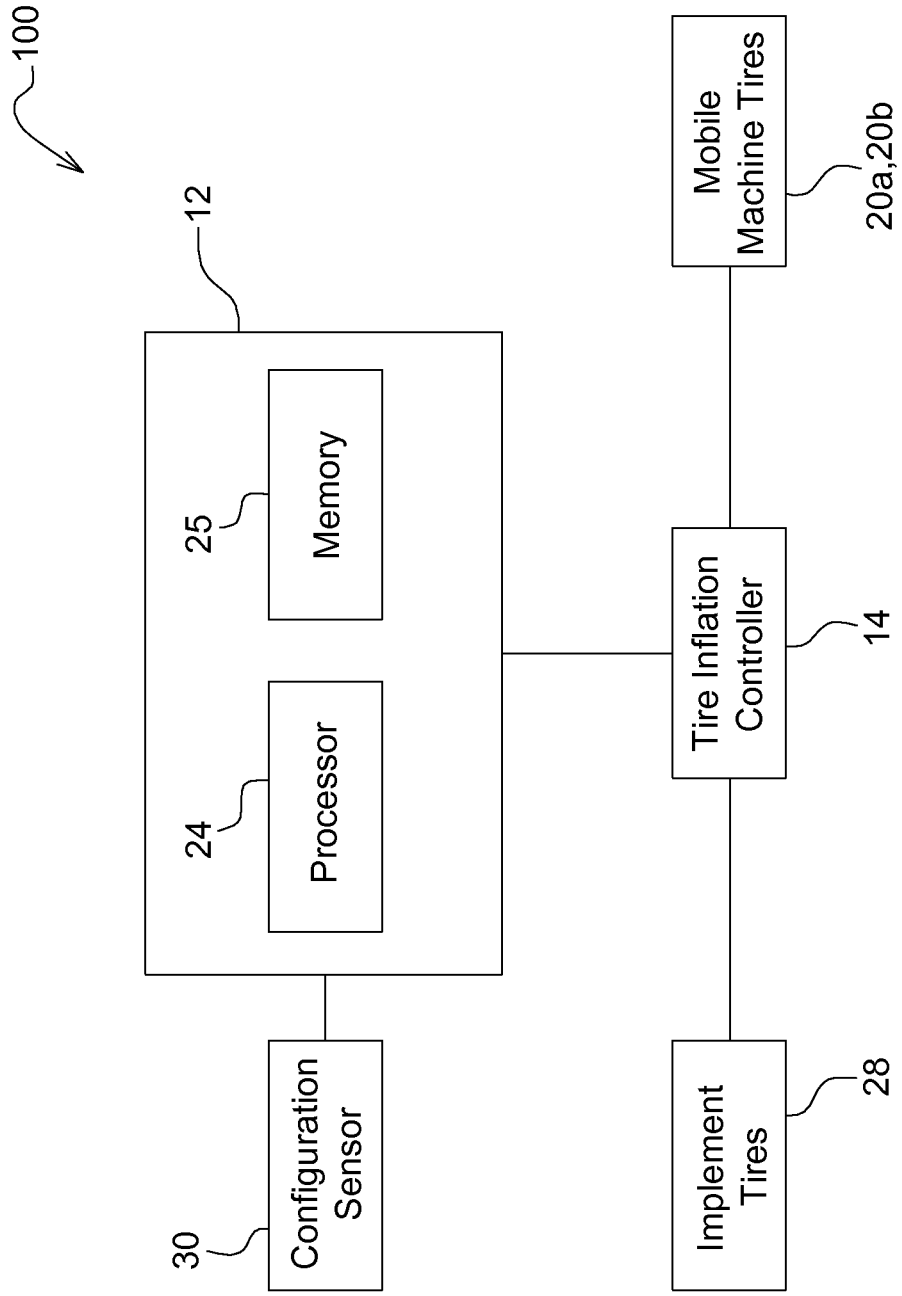
FIG. 2 is a block diagram illustrating an example central tire inflation system for a mobile machine.

FIG. 2 is a block diagram illustrating an example central tire inflation system 100 for a mobile machine, for example mobile machine 10 of FIG. 1.

Referring to FIG. 2, central tire inflation system 100 comprises a controller 12. Controller 12 is coupled to and able to communicate with a tire inflation controller 14, and configuration sensor 30.

Configuration sensor 30 is operable to detect a configuration of mobile machine 10 and/or implement 26, and communicate signals indicative of the configuration to controller 12. The configuration of the mobile machine and/or the implement may be, for example, a field-use configuration, a transport configuration, etc.

In an example, when the mobile machine is coupled to an implement, in the field-use configuration, the mobile machine may be used in the field. In this example, the implement may be in an un-folded configuration, a substantially un-folded configuration, etc.

In an example, when the mobile machine is coupled to an implement, in the transport configuration, the mobile machine may be transported, for example, within a field, from one field to another field, from one filed to another location outside the field, etc. In this example, the implement may be in a folded configuration, a substantially folded configuration, etc.

Example configurations of an implement 126 are illustrated in FIGS. 3A-3E.

In an example, when the mobile machine is a self-propelled mobile machine with utility elements coupled to it, in the field-use configuration the mobile machine may be used in the field. In this example, the utility elements coupled to the mobile machine may be in an un-folded configuration, a substantially un-folded configuration, etc.

In an example, when the mobile machine is a self-propelled mobile machine with utility elements coupled to it, in the transport configuration the mobile machine may be transported, for example, within a field, from one field to another field, from one field to another location outside the field, etc. In this example, the utility elements coupled to the mobile machine may be in a folded configuration, a substantially folded configuration, etc.

The present disclosure will be described in terms of a mobile machine coupled to an implement. However, the teachings of the disclosure are also applicable to a self-propelled mobile machine.

In one implementation, controller 12 is carried by mobile machine 10. In another implementation, controller 12 is carried by implement 126. In the illustrated embodiment of FIG. 2, controller 12 comprises processor 24 and memory 25.

Controller 12 comprises one or more electronic components configured to receive and utilize signals from configuration sensor 30 to determine a configuration of implement 126 and to utilize such determined state for producing an output signal. The output signal is communicated to tire inflation controller 14. The output signal indicates the adjustments to be made to the pressure of mobile machine tires 20a, 20b, the pressure of implement tires 28 or both. In one implementation the adjustment of tire pressure depends on the configuration of the mobile machine 10 and/or implement 126 as indicated by the configuration sensor 30.

The tire inflation controller 14 is operable to adjust the pressure of implement tires 28. In at least some embodiments, the tire inflation controller 14 is also coupled to the mobile machine tires 20a, 20b for adjusting pressure therein. Tire inflation controller 14 controls a compressor and a valve for adjusting the tire pressure. The compressor may be used for increasing the tire pressure by letting more air into the tire. The valve may be used for reducing the tire pressure by letting air out of the tire.

Configuration sensor 30 comprises mechanisms to determine or detect the configuration of mobile machine 10 and/or implement 126. The configuration sensor 30 outputs signals based upon the current configuration of the implement and/or the mobile machine. Examples of sensor 30 include, but are not limited to, a voltage sensor, a current sensor, a torque sensor, a hydraulic pressure sensor, a hydraulic flow sensor, a force sensor, a bearing load sensor, a proximity switch, a rotational position sensor, and the like. The configuration of the mobile machine and/or implement may change from a field-use configuration to a transport configuration. In another example, the configuration of the mobile machine and/or implement may change from a transport configuration to a field-use configuration. The configuration of the mobile machine and/or implement may change in response to an operator activating an input, for example input 22 of FIG. 1. The operator may activate the input to initiate changing the configuration from a field-use configuration, for example, when the mobile machine 10 is getting ready for transport either within a field, from one field to another field, from one field to another location outside the field, etc. The operator may activate the switch to initiate changing the configuration from a transport configuration, for example, when the mobile machine 10 is getting ready to operate in a field.

In one implementation, tire inflation controller 14 may be programmed to receive instructions from controller 12. The tire inflation controller 14 uses that information to adjust the tire pressure in the implement tires 28 and/or the mobile machine tires 20a, 20b. Thus, for example, the tire inflation controller 14 is programmed to increase the pressure in implement tires 28 and/or mobile machine tires 20a, 20b, upon a determination that the configuration of the implement has changed from a field-use configuration to a transport configuration. In another example, the tire inflation controller 14 is programmed to reduce the pressure in implement tires 28 and/or mobile machine tires 20a, 20b, upon a determination that the configuration of the implement has changed from a transport configuration to a field-use configuration.

Although, the disclosure refers to a change in configuration, it should be clear that in an example embodiment, this includes initiation of change in configuration, completion of change in configuration or any state between initiation and completion of change in configuration. For example, the tire inflation controller 14 may be programmed to increase the pressure in the implement tires and/or mobile machine tires, upon a determination that a change in configuration of the implement from a field-use configuration to a transport configuration has been initiated, in process or completed. In another example, the tire inflation controller 14 may be programmed to reduce the pressure in the implement tires and/or mobile machine tires, upon a determination that a change in configuration of the implement from a transport configuration to a field-use configuration has been initiated, in process or completed.

Controller 12 comprises processor 24 and memory 25. Processor 24 comprises one or more processing units configured to carry out instructions contained in memory 25. According to one example, the term "processing unit" refers to a presently developed or future developed processing unit that executes sequences of instructions contained in a memory. Execution of the sequences of instructions causes the processing unit to perform steps, such as generating control signals. The instructions may be loaded in a random access memory (RAM) for execution by the processing unit, from a read only memory (ROM), a mass storage device, or some other persistent storage. In other embodiments, hard wired circuitry may be used in place of or in combination with software instructions to implement the functions described. For example, controller 12 may be embodied as part of one or more application-specific integrated circuits (ASICs). Unless otherwise specifically noted, the controller is not limited to any specific combination of hardware circuitry and software, nor to any particular source for the instructions executed by the processing unit.

Memory 25 comprises a non-transient computer-readable medium or persistent storage device for storing data for use by processor 24 or generated by processor 24. In one implementation, memory 25 may additionally store instructions in the form of code or software for processor 24. The instructions may be loaded in a random access memory (RAM) for execution by processor 240 from a read only memory (ROM), a mass storage device, or some other persistent storage. In other embodiments, hard wired circuitry may be used in place of or in combination with software instructions to implement the functions described. For example, at least regions of memory 25 and processor 24 may be embodied as part of one or more application-specific integrated circuits (ASICs).

In some implementations, some of the aforementioned functions of processor 24 and memory 25 may be shared amongst multiple processors or processing units and multiple memories/databases, wherein at least some of the processors and memories/databases may be located remote with respect to mobile machine 10.

Figure 3E:
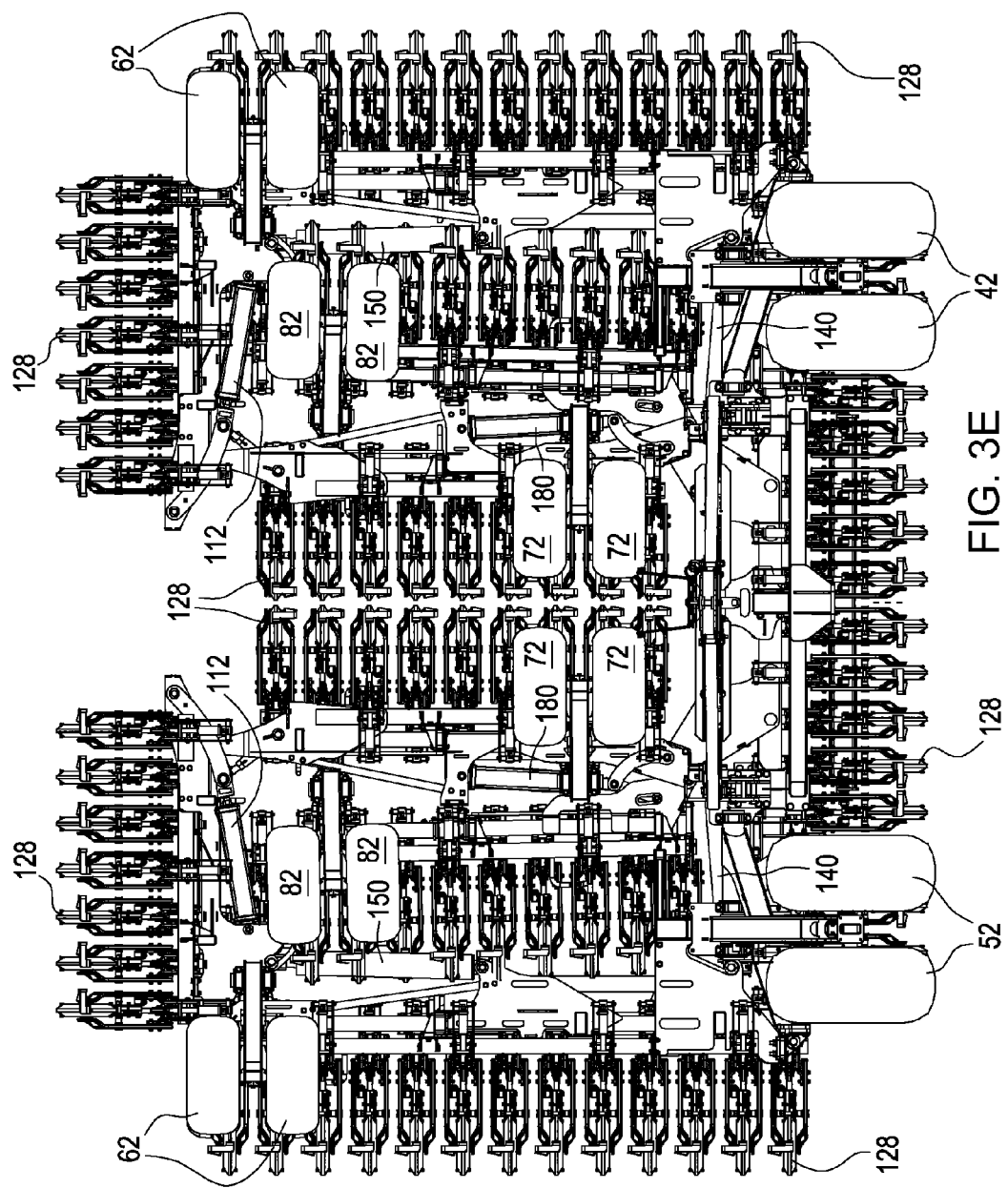
FIG. 3E is an example rear view of the frame of an implement.

FIGS. 3A-3D are example rear views of the left side of a frame of the implement 126 and FIG. 3E is an example rear view of the frame of the implement 126. The folding and unfolding of the implement 126 is described in greater detail in U.S. Pat. No. 8,505,645, which is incorporated herein by reference.

FIG. 3A is an example illustration of implement 126 in an un-folded configuration. FIGS. 3B and 3C are example illustrations of implement 126 in a substantially un-folded configuration. FIG. 3D is an example illustration of implement 126 in a substantially folded configuration. FIG. 3E is an example illustration of implement 126 in a folded configuration.

In an example embodiment, in the un-folded configuration, the main section of the frame and the wings are generally aligned with one another in a horizontal orientation. While shown as being generally horizontal, this is when placed on level ground. The inner wings are allowed a certain amount of rotation about the inner wing axes 46 to allow the inner wings to follow the ground contours. Likewise, the joined middle and rigid wings are allowed some rotation about the middle wing axes 56 while the outer wings are allowed to rotate about the outer wings axes 86, all to follow the ground contours.

A plurality of hydraulic cylinders are provided to fold the implement 126 from the un-folded configuration shown as an example in FIG. 3A to the folded configuration shown as an example in FIG. 3E. The folding sequence is described below. Hydraulic cylinders 140 are connected to the frame main section 130 and the inner wings 40. The cylinder rods of the cylinders 140 are coupled to brackets on the inner wings in a slot. The slotted connection of the rod to the bracket allows for limited rotation of the inner wings about the inner wing axes as the implement is moved over the ground to enable the implement to follow the ground contours. Similarly, hydraulic cylinders 150 are connected to the inners wings 40 and the middle wings 50. Hydraulic cylinders 180 are connected to the rigid wings and the outer wings. Slotted connections of the rods of cylinders 150 and 180 allow for limited movement of the wings as described above enabling the wings to follow the ground contours.

Folding of the implement 126 from the un-folded configuration to the folded configuration is accomplished as follows. First the frame is lowered relative to the wheel assemblies. The fold sequence is then initiated and the frame is raised to its uppermost position. The ground working tools 128 are then retracted if they are of a retractable design. Folding begins by first actuating cylinders 180 to rotate the outer wings 81 about the outer wings axes 86. The outer wings are rotated approximately 180 degrees to a position in which the outer wings overlie the rigid wing as shown in FIG. 3B. The outer wing wheel assemblies 82 are then retracted relative to the frame, for example, the wheel assemblies are moved to the position relative to the frame they are in when the frame is lowered in the un-folded configuration.

The middle wings 50 and the rigid wings 70 are raised together as a fixed unit with the hinge assemblies still locked. The middle and rigid wings are raised by actuation of the cylinders 150 and are raised together until the middle wings 50 are raised to about a twenty degree angle. Before doing so, the cylinders 140 are retracted to apply a lifting force on the inner wings 40. The lifting force is not sufficient to lift the inner wings but to transfer weight from the inner wings to the center section 130. This improves stability of the frame during folding and also reduces the load on the inner wing wheel assemblies 62. After the middle wings are raised twenty degrees, locking hinges are released by operation of the cylinders 112 and the rigid wings are rotated about the axes 76 about 90 degrees to extend at approximately a right angle relative to the middle wings. The cylinders 150 are further actuated to rotate the middle wings 50 a total of approximately 90 degrees about the middle wing axes 56 to the position shown in FIG. 3D. Now the middle wings are extending upwardly with the rigid wings extending laterally above the inner wings and with the outer wings between the inner and rigid wings. The rigid wing wheel assemblies 72 are then retracted relative to the frame.

The next step in the folding sequence is the actuation of the cylinders 140 to now rotate the inner wings approximately 90 degrees to the folded configuration shown in FIG. 3E. The inner wings wheel assemblies 62 are then retracted. The inner wings are now extending upwardly, the middle wings extend laterally inwardly, the rigid wings extend downwardly and the outer wings extend upwardly beneath the middle wings and between the inner and rigid wings. During the folding operation, the outer wings are rotated a total of approximately 450 degrees from the un-folded configuration to the folded configuration. The rigid wings rotate 270 degrees from the un-folded configuration to the folded configuration. The middle wings rotate 180 degrees from the un-folded configuration to the folded configuration while the inner wings only rotate 90 degrees from the un-folded configuration to the folded configuration.

To fold the implement, the locking hinge joint is unlocked allowing the rigid wings to rotate relative to the middle wings about the rigid wing axes 76. In an example implementation, the middle wings do not have wheel assemblies connected thereto. The wing wheel assemblies are only mounted to the wings that are oriented upright in the folded configuration. This helps to minimize the overall height of the implement in the folded configuration as there are no wheel assemblies extending upwardly from the middle wings. Wing wheel assemblies 62 on the inner wings extend laterally and depending on the size of the tools and wheel assemblies may increase the transport width of the implement 30 but not the height.

In an example embodiment, when implement 126 is in an un-folded configuration, it is used for field operations. In an example embodiment, when implement 126 is in a folded configuration, it is used for transport. In the un-folded configuration, the weight of the implement 126 is distributed over substantially its entire width. As illustrated in FIG. 3E, in the folded configuration, the weight of the implement 126 is on center tires 42 and center tires 52. In an example implementation, when the implement 126 is in the folded configuration, the pressure in tires 42, 52 is increased. This supports the additional weight on the tires due to the weight of the implement being on tires 42, 52 rather than being distributed across the width of the implement. Also, since implement 126 is folded for transport, the increased tire pressure facilitates road transport of implement 126 where soil compaction is not a concern.

Figure 4:
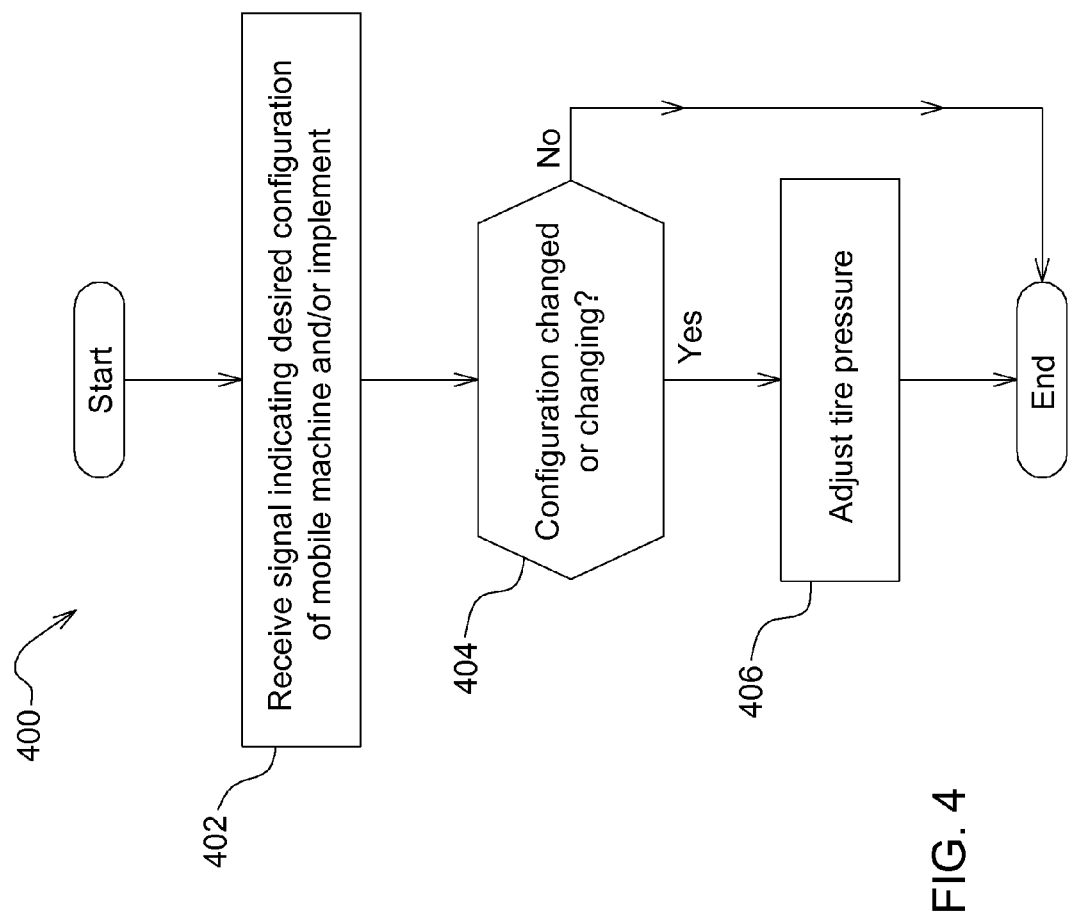
FIG. 4 is a flow diagram of an example method for automatic tire pressure adjustment.

FIG. 4 is a flow diagram of an example method 400 for automatic tire pressure adjustment. In an example implementation, method 400 is executed by central tire inflation system 100 of FIG. 2. More specifically, in an example implementation, method 400 is executed by controller 12 of central tire inflation system 100.

At block 402, a signal indicating the desired configuration of the mobile machine and/or the implement is received. The signal may be received, for example, in response to an operator of mobile machine 10 activating input 22 to initiate change in the configuration of the mobile machine and/or the implement. For example, the signal may indicate whether the mobile machine and/or implement is to be in a transport configuration or a field-use configuration. The signal may be received from mobile machine 10 or from implement 126.

At block 404, a determination is made as to whether the configuration of the mobile machine and/or the implement has changed or is changing. For example, if the received signal indicates that the mobile machine and/or the implement is to be in a transport configuration and the mobile machine and/or the implement was in a field-use configuration prior to receiving the signal, then it is determined that the configuration of the mobile machine and/or the implement has changed or is changing. In another example, if the received signal indicates that the mobile machine and/or the implement is to be in a field-use configuration and the mobile machine and/or implement was in a transport configuration prior to receiving the signal, then it is determined that the configuration of the mobile machine and/or the implement has changed or is changing. If at block 404, it is determined that the configuration of the mobile machine and/or the implement has not changed, then the process terminates.

If at block 404, it is determined that the configuration of the mobile machine and/or the implement has changed or is changing, then at block 406, the pressure of the tires is adjusted. In an example, if it is determined that the configuration of the mobile machine and/or the implement has changed from a field-use configuration to a transport configuration, than the pressure of the tires in increased. On the other hand, as an example, if it is determined that the configuration of the mobile machine and/or the implement has changed from a transport configuration to a field-use configuration, than the pressure of the tires is reduced.

In an example, at block 406, the pressure of at least one tire of the implement and at least one tire of the mobile machine is adjusted. In another example, the pressure of at least one tire of only the implement is adjusted. In another example, the pressure of at least one tire of only the mobile machine is adjusted.

The adjustment of the tire pressure includes, without limitation, initiation of adjustment of the tire pressure, completion of adjustment of the tire pressure, or anything in between. For example, at block 406, the process of adjusting or changing the tire pressure is initiated. As another example, at block 406, the process of adjusting or changing the tire pressure is completed.

In an example, the tire pressure is adjusted from a first predetermined level to a second predetermined level. The first and/or second predetermined level may be preset or set by an operator in real time, for example, when the operator changes the configuration of the mobile machine and/or the implement. Furthermore, the amount of adjustment of the pressure may vary from tire to tire. For example, pressure of one or more tires may not be adjusted at all, pressure of one or more tires may be increased, or pressure of one or more tires may be reduced.

For example, when the configuration of the implement is changed from a field-use configuration to a transport configuration, only the pressure of tires 42, 52 (FIG. 3E) may be increased, while the pressure of other tires of the implement may remain unchanged. This would be advantageous, for example, since tires 42, 52, are the only tires in engagement with the ground.

As another example, when the configuration of the implement is changed, for example, from the transport configuration shown in FIG. 3E to a field-use configuration, then in an example, the pressure of only tires 42, 52 may be reduced, while the pressure of other tires of the implement may remain unchanged.

In another example, when the configuration of the implement is being changed from a field-use configuration to a transport configuration, the increase in the pressure of the tires may be initiated as soon as the change in configuration of the implement begins. This might allow the center tires of the implement to have increased pressure when the change in configuration is completed. On the other hand, when the configuration of the implement is being changed from a transport configuration to a field-use configuration, the reduction in the pressure of the center tires of the implement is initiated when the implement is in a substantially field-use configuration.

Without in any way limiting the scope, interpretation, or application of the claims appearing below, a technical effect of one or more of the example embodiments disclosed herein is that tire pressure can be automatically adjusted based on a configuration of a mobile machine/or an implement. Another technical effect of one or more of the example embodiments disclosed herein is that tire pressure can be automatically adjusted for transportation. Another technical effect of one or more of the example embodiments disclosed herein is that tire pressure can be automatically increased for transportation when the configuration of the mobile machine and/or the implement is being changed into a transport configuration. Another technical effect of one or more of the example embodiments disclosed herein is that tire pressure can be automatically reduced for operation in a worksite when the configuration of the mobile machine and/or the implement is being changed into a field-use configuration.

While the above describes example embodiments of the present disclosure, these descriptions should not be viewed in a limiting sense. Rather, there are several variations and modifications which may be made without departing from the scope of the present invention as defined in the appended claims.

What is claimed is:

1. A method for use with a mobile machine having a frame movable between a transport configuration and a field-use configuration, a configuration sensor to determine the configuration of the mobile machine and a central tire inflation system operable to adjust a pressure of at least one tire of the mobile machine, the method comprising:
    determining a change in configuration of a mobile machine; and
    in response to determining the change in configuration, initiating operation of the central tire inflation system to adjust a pressure of the at least one tire of the mobile machine.

2. The method of claim 1, wherein the adjustment of the pressure comprises changing the pressure from a first predetermined level to a second predetermined level, wherein the first and second predetermined levels are set by an operator of the mobile machine.

3. The method of claim 1, wherein the adjustment of the pressure of the at least one tire of the mobile machine comprises increasing the pressure of the at least one tire of the mobile machine in response to determining that the configuration of the mobile machine has changed from the field-use configuration to the transport configuration.

4. The method of claim 1, wherein the adjustment of the pressure of at the least one tire of the mobile machine comprises reducing the pressure of the at least one tire of the mobile machine in response to determining that the configuration of the mobile machine has changed from the transport configuration to the field-use configuration.

5. The method of claim 1, wherein the determining the change in configuration of the mobile machine is based at least in part on an input received from an operator of the mobile machine.

6. An apparatus, comprising:
a mobile machine having a frame movable between a transport configuration and a field-use configuration; and
a central tire inflation system operable to adjust a pressure of at least one tire of the mobile machine, in response to a determination of a change in configuration of the mobile machine between the transport configuration and the field-use configuration.

7. The apparatus of claim 6, wherein the central tire inflation system is operable to increase the pressure of the at least one tire of the mobile machine in response to a determination that the configuration of the mobile machine has changed from the field-use configuration to the transport configuration.

8. The apparatus of claim 6, wherein the central tire inflation system is operable to reduce the pressure of the at least one tire of the mobile machine in response to a determination that the configuration of the mobile machine has changed from the transport configuration to the field-use configuration.

9. The apparatus of claim 6, wherein the central tire inflation system is operable to initiate an increase in a pressure of at least one tire of an implement coupled to the mobile machine in response to initiation of a change in configuration of the implement from the field-use configuration to the transport configuration.

10. The apparatus of claim 9, wherein the central tire inflation system is operable to initiate a reduction in a pressure of the at least one tire of the implement in response to the implement substantially reaching the field-use configuration from the transport configuration.

11. The apparatus of claim 6, wherein the determination of the change in configuration of the mobile machine is based at least in part on an input received from an operator of the mobile machine.

\* \* \* \* \*